United States Patent [19]

Crum et al.

[11] Patent Number: 4,605,099
[45] Date of Patent: Aug. 12, 1986

[54] BRACKET MEANS PROVIDING FULL COLLAPSIBILITY TO SAWHORSES

[76] Inventors: Wesley W. Crum, 17239 Sycamore Rd.; Gary L. Fraley, P.O. Box 946, both of Mount Vernon, Ohio 43050

[21] Appl. No.: 735,129

[22] Filed: May 17, 1985

[51] Int. Cl.[4] .................. B27B 21/00; F16M 11/00
[52] U.S. Cl. .............................. 182/155; 182/181; 182/225
[58] Field of Search ................ 182/155, 181–186, 182/224–226; 108/129; 248/188.6

[56] References Cited

U.S. PATENT DOCUMENTS

| | | | |
|---|---|---|---|
| 199,320 | 1/1878 | Seng | 182/155 |
| 1,435,738 | 11/1922 | Reiman | 182/155 |
| 1,818,629 | 8/1931 | Knapp | 108/129 |
| 2,651,487 | 9/1953 | Loock | 182/181 |
| 2,794,688 | 6/1957 | Scott | 182/185 |
| 2,824,771 | 2/1958 | Blenski | 182/155 |
| 3,269,487 | 8/1966 | Larson | 182/155 |
| 4,144,822 | 3/1979 | Roberts | 108/129 |
| 4,152,834 | 5/1979 | Stansberry | 182/155 |
| 4,489,808 | 12/1984 | Voye | 182/155 |

Primary Examiner—Reinaldo P. Machado
Attorney, Agent, or Firm—Robert A. Spray

[57] ABSTRACT

A support bracket for a sawhorse, by which the legs are connected to the spine rail of the sawhorse, and provide full collapsibility of the legs. In a preferred embodiment, the bracket has an intermediate panel and side panels, in an overall generally U-shape, with the intermediate panel disposed generally vertically, and transversely of the axis of the spine rail; and the side panels, which extend from the intermediate panel, pivotally carry the sawhorse legs. Co-operative latch components of the side panels and the legs latchingly hold the legs in optionally an extended position or in a retracted position generally juxtaposed along the spine rail, providing that the sawhorse may be easily changed from a conventional erect condition to a collapsed condition in which the entire assembly occupies scarcely any more space than the spine rail of the sawhorse; and the latch has a special feature which permits that fullness of leg-collapse regardless of which of the legs are first moved to collapsed position.

24 Claims, 7 Drawing Figures

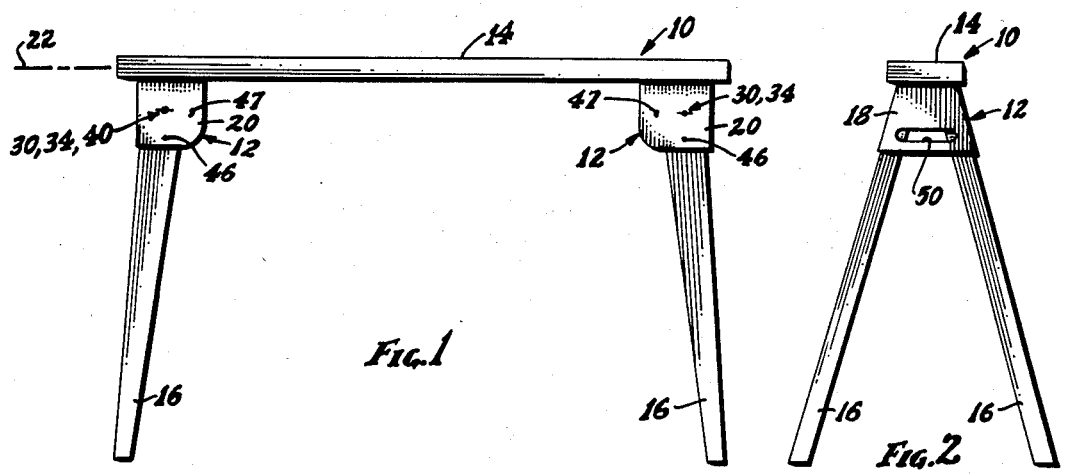
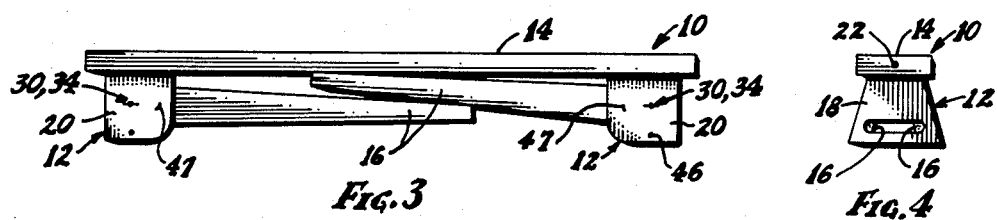
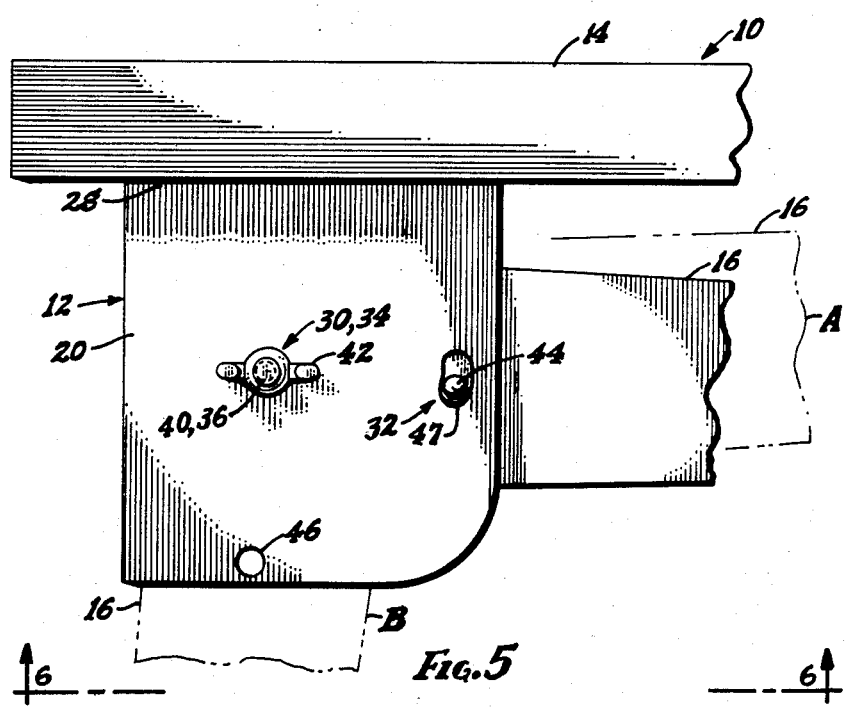

BRACKET MEANS PROVIDING FULL COLLAPSIBILITY TO SAWHORSES

FIELD AND BACKGROUND OF THE INVENTION

The present invention relates to sawhorses, such as are used for various support tasks in carpentry or other tasks requiring elevated support of various objects or work-pieces; and, more particularly, the invention relates to a novel and advantageous support bracket for a sawhorse, for providing full collapsibility of the sawhorses, as to storage when not in use, and transport between jobs or between a job site and the equipment storage building. Certain tasks may require a partial collapsibility of the legs, i.e., only of the legs at one end of the sawhorse; and the inventive concepts provide that function and operability also.

A long-bothersome problem with sawhorses is their awkwardness of size; for conventionally and for desired variety of use they are built of an elongated central member which provides an elevated support component in the form of a spine rail, of a length of about four feet or more, which is supported at each end by a pair of outwardly-spread legs, the area between the outer extremities of the legs being usually over eight square feet.

The problem of their size is compounded by their awkward shape; and whenever they are not stored or transported with all four legs resting on the ground, one or more of their legs will be awkwardly and dangerously protruding outwardly, a hazard to persons and whatever else is in the vicinity, particularly hazardous in many storage areas where available space seems never to be big enough.

Such awkward shape and size prevents their convenient storage when not in use, and the resulting inability of storage prevents their use by many persons, who in job-tasks ideally suited for a sawhorse must go to the bother of improvising other supporting means, such as use of ladders, blocks, tables, even car fenders, etc.; and such other and makeshift arrangements have obvious disadvantages.

Thus the present invention provides a novel support bracket providing collapsibility of the sawhorse legs, and thus in effect provides and achieves a full collapsible sawhorse.

PRIOR ART

The problem of the awkwardness of sawhorses, as making their storage and transport quite bothersome and inconvenient, which is a problem so disadvantageous that many persons simply cannot keep a sawhorse or sawhorses for use, has existed for scores of years; and the problem surely has been immediately apparent to everyone who has ever used a sawhorse.

And thus the advantageous nature of the present inventive concepts is emphasized by the lack of a fully-collapsible sawhorse of the present nature in spite of the prior art already having had metal connector brackets for sawhorse legs, and even metal connector brackets in which there is provided a form of collapsibility.

For example, a form of metallic sawhorse connector bracket is that of a sawhorse bracket of Hardware Wholesalers, Inc., and sold under the trademark HWI, and sold as HWI No. 346,762 (apparently some sales identifier rather than a patent number). Such a bracket is connectable to both the sawhorse's spine rail and to its legs, and provides some pivoting for the express purpose of providing some easing-of-storage collapsibility. But there are significant disadvantages of that device in comparison to the present invention; for in that prior art device collapsibility can be only that of bringing the two legs of each end of the sawhorse inwardly with respect to their lateral extent from the sawhorse's spine rail. Thus although this collapsibility of this prior art device gives a partial effect of collapse, such that the legs and spine rail are in a single general plane, there is still an awkward area of about eight square feet, with each end pair of legs sticking out from the sawhorse's spine rail, that is, sticking out perpendicularly and thus also quite awkwardly and hazardously from the standpoint of storage and transport.

Further emphasizing the advantageous nature of the inventive concepts, it is to be noted that the prior art for scores of years has had various illustrations of folding legs, particularly for desires of ease of storage and transport; and such features in one form or another have of course been well known for many years, on items such as folding "army cots", collapsible beds, tables of various sorts and uses, etc., and pivotal brackets have similarly been known for years in such diverse items as flagpole holders, foldable stands, etc.

In spite of all such prior art, and in spite of the long recognized desire and need for collapsibility of sawhorses in particular, and even though the prior art has provided the pivot-carrying brackets mentioned above for providing a partial collapse of a sawhorse into a single general plane, with two sets of legs protruding outwardly from the spine rail, the prior art has failed to provide a sawhorse bracket by which is achieved what may be called a full collapsibility, i.e., not merely to a single general plane, but to a single general line, and not merely to only two (rather than conventionally four) legs protruding outwardly from the spine rail, but with no legs at all protruding.

Quite in contrast to the prior art, a sawhorse using brackets of the present invention not only departs conceptually from the prior art in those respects, but with the novel brackets of the present invention, all four legs of the sawhorse collapse into close and compact juxtaposition with the spine rail, along it and under it and in generally maximally closely adjacent the spine rail; and not only is that compactness itself achieved, the novel brackets of the present invention permit the leg pairs of either end of the sawhorse to be the ones first moved to collapsed condition.

These long-needed departures from the prior art emphasize the inventive nature of the concepts which these brackets achieve and provide.

THE PRESENT INVENTION SUMMARIZED

In accordance with the inventive concepts, full collapsibility of all the sawhorse legs is provided by providing for each end of the sawhorse's spine rail a rigid bracket in the form of a three-panelled bracket body member, of a generally U-shape, having an intermediate panel and side panels; and when installed on the spine rail, the intermediate panel is disposed generally vertically, and transversely of the axis of the spine rail. The side panels extend from the intermediate panel, sloping outwardly and downwardly, and carry pivot means provided for each side panel pivotally connecting to a sawhorse leg, permitting the leg to pivot although always along the plane of the respective side panel. Latch components are carried by each leg and side panel, for latchingly holding the leg in optionally an extended or sawhorse-erect position, and in a retracted or sawhorse-collapsed position; and in and between both positions or conditions the legs is generally parallel to the respective side panel, and in the collapsed condition the leg is generally juxtaposed along and under the spine rail, providing full and/or maximal compactness for advantageous storage and transport characteristics, even though the side panel slopes outwardly for providing desired leg-spread stability of the sawhorse.

Further advantage is provided by providing that the latch components provide a particular looseness or allowance as to latching position, permitting fully latched closure of the legs of either end regardless of whether the legs of the other end of the sawhorse have been moved to collapsed or latched position, thus making it a matter of indifference as to which leg along a respective side of the spine rail is first moved into leg-retracted latched position.

The above description is of somewhat introductory and generalized form, even though specifying the concepts. More particular details and features are set forth in the following and more detailed description of an illustrative embodiment, taken in conjunction with the accompanying drawings.

BRIEF DESCRIPTION OF THE DRAWING

The drawings are of somewhat of a generally schematic or diagrammatic nature for illustrating the inventive concepts; and in the drawings:

FIG. 1 is a side elevational view of a collapsible sawhorse, in erected condition of its legs;

FIG. 2 is an end elevational view of the sawhorse of FIG. 1, in the erect condition as in FIG. 1;

FIG. 3 is a side elevational view of the sawhorse of FIG. 1, but with its legs in fully-collapsed condition of the sawhorse;

FIG. 4 is an end view of the collapsed sawhorse;

FIGS. 5-7 are detail views on a scale greatly enlarged over the scale of the views shown as FIGS. 1-4, and all showing merely the left end of the sawhorse for illustration, for the right end is similar; and more particularly:

FIG. 5 is a detail view of an end of the sawhorse, in side elevational view as in FIG. 1, and showing one of the left ones of the sawhorse leg, the leg being shown in full lines in its leg-collapsed condition as one of the leg pair which is the last to be collapsed, i.e., like the left leg shown in FIG. 3, and in the chain line position marked "A" as if it were one of the leg pair which is first to be collapsed, i.e., like the right leg shown in FIG. 3, and in the chain line position marked "B" in the leg-extended condition as in FIG. 1;

FIG. 6 is a detail view of the underside of the left end of the sawhorse, as would be seen by View-line 6—6 of FIG. 5, the legs being shown in collapsed condition; and FIG. 7 is a transverse cross-sectional view of the sawhorse, shown generally as taken by Section-line 7—7 of FIG. 6, the Section-line 7—7 being of so-called "broken" or "staggered" nature for illustrating connections otherwise possibly obscure.

DETAILED DESCRIPTION OF PREFERRED EMBODIMENT

Figure 6:
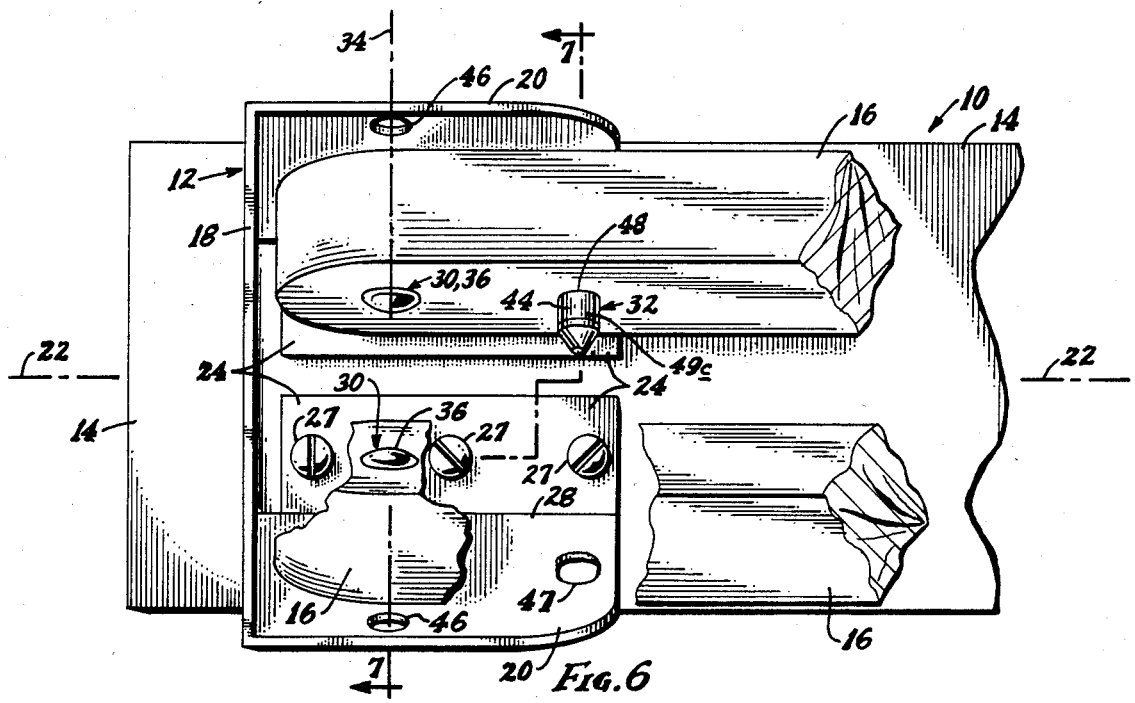

As shown in the drawings, the inventive concepts provide and achieve full sawhorse collapsibility of a sawhorse 10, by the provision of a novel and advantageous support bracket means 12 for the sawhorse 10.

The sawhorse 10 is otherwise quite conventional, in that it has a horizontal spine rail 14 which is supported at each end by a pair of outwardly-spread legs 16. As detailed below, the legs 16 are connected to the respective end of the spine rail 14 by the novel support bracket 12, achieving not only an firm connection of the legs 16 and spine rail 14, but also full collapsibility of the sawhorse by novel means.

(By the phrase "full or maximal collapsibility", this is with regard to the great achievement of making the entire collapsed assembly of spine rail 14 and legs 16 substantially as compact as that of only the spine rail 14 itself; and it is not asserted that the spine rail 14 could not itself be somehow collapsed or shortened such as by making it of telescoping sections. However, the length of the spine rail 14 is not believed to be nearly the cause of awkwardness, bulk, and bother of sawhorse storage and transport as is the large area and volume taken up by the extended leg structure of a conventional sawhorse, and the hazardous nature of sawhorse legs as sticking out from the spine rail of a sawhorse. Thus, it is believed to be quite apt to designate the achievement of the present invention as that of full or maximal collapsibility).

The support bracket is shown as a three-panelled bracket body member 12, one of which is provided for each end of the spine rail 14; and each bracket body member 12 is shown as having an intermediate panel 18 and two side panels 20. In the form of bracket body member 12 shown, when viewed from above and from a point axially outwardly of the end of the spine rail 14 when the body 12 is assembled thereto, the bracket body 12 is seen to be of a generally U-shape.

When the bracket body 12 is assembled to the spine rail 14, it will be noted that the intermediate panel 18 is disposed generally vertically, and also it is disposed transversely of the axis 22 of the sawhorse's spine rail 14; and the side panels 20 extend from the intermediate panel 18 generally parallel to the axis 22 of the spine rail 14, and generally perpendicular to the intermediate panel 18, but sloping outwardly and downwardly.

At the top edge of the bracket body member 12, there are provided panel or tab means 24 which extend under the respective end of the spine rail 14 for supportive connection of the bracket body 12 to the spine rail 14; and the tabs 24 have openings 26 for nails or screws (as at 27) for making the connection to the spine rail.

The tabs 24 as shown extend from the upper edge 28 of the side panels 20; and this provides the extra stability for the slope of the side panels 18 by the stiffness of the integral bend at edge 28, the tabs 24 being integral extensions of side panels 20, and the effect of the intermediate panel 18 as a brace.

Turning now more specifically to the advantageous leg-collapsibility feature, it will be noted that there are pivot means shown generally by reference numeral 30, which are provided for pivotally interconnecting each respective one of the sawhorse legs 16 to each of the side panels 20 of the bracket bodies 12; and each leg 16 and side panel 20 are provided with co-operative latch means, indicated generally by reference numeral 32, by which the sawhorse legs 16 are latchingly held optionally in a sawhorse-erect condition, i.e., an extended-leg position in which the legs 16 are held generally parallel to the respective side panel 20 for elevated support of the spine rail 14 by the sawhorse legs 16, and in sawhorse-collapsed condition, i.e., a retracted-leg position in which each respective leg 16 is also generally parallel to the respective side panel 20 but generally juxtaposed along the spine rail 14, in a compact position of close snugness to the spine rail 14, achieving full or maximum collapse of the sawhorse 10 by full or maximum collapse of the legs 16.

More particularly as to the leg-collapsibility feature, each leg 16 is pivotally movable about the axis 34 of the respective pivot means 30 between and into each such position, i.e., sawhorse-erect condition and sawhorse-collapsed condition, by options available as to the latched engagement of the legs 16 with the respective side panel 20.

As to the connection at pivots 30, each of the pivot means 30 holds the respective leg 16 to the respective side panel 20 in a manner such that in the latched position of the leg 16, in which the leg 16 is in extended position for sawhorse-erect support of the spine rail 14, the leg 16 is lying along the respective side panel 20, the slope of the side panel 20 thus providing and assuring the outward slope of the leg 16 for desired stability of the sawhorse 10.

The components of the pivotal connections 30 are shown as a bolt 36 which passes through aligned holes 38–40 in the leg 16 and a central portion of each side panel 20 respectively, and held by a wing nut 42. Washers of course may be provided.

Further as to the latch means 32 in the illustrative embodiment, it is shown as having components comprising a spring pressed abutment pin 44 carried by one of the respective leg 16 and side panel 20 (here the leg 16) and an opening means 46 or 47 provided in the other of the respective leg 16 and side panel 20 (here the side panel 20); and for optionally of position of latching, the side panel 20 is shown as being provided with two of its latch components (here the holes 46 and 47), and by optional selection by the user as to which of the holes 46 or 47 it is, in which the abutment pin 44 is latched, the user achieves whichever of the optional-position leg-latchability effects he or she desires, i.e., to achieve sawhorse-erect condition or sawhorse-collapsed condition.

Both of the bracket openings 46 and 47 are of course at the same distance from the bracket-opening 40 of the pivot means 30, which is of course the same spacing as the leg-openings 38 (of the pivot means 30) and 48 in which the abutment pin 44 is disposed; and the spring 49 of the abutment pin 44 urges it through either of the bracket openings 46 or 47, establishing and maintaining the latchingly-held condition or position of the leg 16 as the user manually rotates the leg 16 about the axis 34 of the pivot bolt 36 in leg-opening 38. Bracket-opening 46 is downwardly from pivot opening 40 of bracket-panel 20, providing leg-extended latching of the leg 16; and bracket-opening 47 is horizontally inwardly of the bracket's pivot-opening 40, providing leg-collapsed latching of the leg 16.

Figure 7:
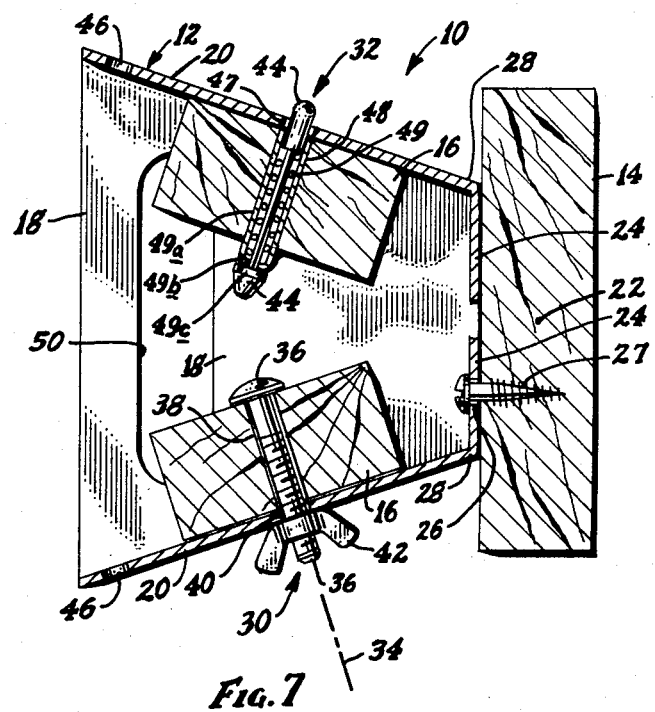

The pin 44 and spring 49 of latch 32 are shown (FIGS. 6 and 7) as carried in a cylinder 49a, pressed in the leg-opening 48; and the inner end of the cylinder 49a is inturned as at 49b, providing a stop for the head 49c of pin 44, and a bottom for the spring 49, the spring 49 thus biasing the pin 44 outwardly (into hole 46 or 47 as the case may be), and the head 49c providing a graspable part for the user to manually grasp to pull the pin 44 inwardly (out of hole 46 or 47) to release whichever is the latched position of each leg 16.

As a special advantage, it will be noted that the latch component which is the opening 47 which provides leg-retracted latching is of elongated nature, this being for the bracket body member 12 at both ends of the spine rail 14, thus providing a looseness or allowance of latching position, permitting the leg 16 at either end of the spine rail 14 to lie snugly against the spine rail, but long enough that the latter of the legs 16 will be latched even though an earlier-collapsed leg 16 is already latched snugly against the spine rail 14, thus making it a matter of indifference as to which leg 16, along a respective side of the spine rail 14, is first moved into leg-retracted latched position. Thus the bracket-opening 47 is in a sort of kidney shape, concentric about the pivot opening 40.

A further feature of the illustrative embodiment is that the intermediate panel 18 of each bracket body 12 is provided with a handle means, here a slot 50, thus providing for each intermediate panel 18 the function of a sawhorse handle at each end of the spine rail 14 thus making sawhorse 10 easy to grasp regardless of which end thereof is being grasped, and a brace which supports the side panels 20.

CONCLUSION

It is thus seen that a support bracket for a sawhorse, with the bracket and the leg-collapsibility according to the inventive concepts, provides a desired and advantageous sawhorse of novel and collapsible-leg nature, with the legs when in collapsed condition lying in a fully-retracted manner along the spine rail of the sawhorse, thus yielding the advantages of maximum leg-collapsibility which is easily manipulated to achieve optionally either erect or collapsed condition, and achieving in this novel combination a device and advantages not achieved by conventional sawhorses.

Accordingly, it will thus be seen from the foregoing description of the invention according to this illustrative embodiment, considered with the accompanying drawings, that the present invention provides new and useful concepts of a bracket for a sawhorse which provides and achieves a novel and advantageous collapsible sawhorse with advantages of convenience of storage and handling, yet with great sturdiness when in its leg-erect condition. Convenience is provided by the ease of changing from either condition to the other, and all the legs are fully latchable into retracted position regardless of the sequence used, all features contributing to and yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

We claim:

1. A support means for a sawhorse having a horizontal spine rail which is supported at each end by a pair of outwardly-spread legs which are connected to the respective end of the spine rail by a support bracket, the support means comprising;

a three-panelled bracket body member, having an intermediate panel and side panels, and which when viewed from above and from a point axially outwardly of the end of the spine rail when assembled thereto is of a generally U-shape, with the intermediate panel disposed generally vertically, and transversely of the axis of the spine rail, and with the side panels extending from the intermediate panel, generally parallel to the axis of the spine rail, and generally perpendicular to the intermediate panel, but sloping outwardly and downwardly.

and the bracket body member also has panel means which extend under the respective end of the spine rail, for supportive connection thereto;

and there are pivot means provided for pivotally interconnecting a sawhorse leg to each of the side panels, and each leg and side panel are provided with co-operative latch means by which the sawhorse legs are latchingly held in optionally an extended position generally parallel to the respective side panel, for support of the spine rail by the sawhorse legs, and in a retracted position also generally parallel to the respective side panel but generally juxtaposed along the spine rail, and each leg is pivotally movable about the axis of the respective pivot means between and into each position of latched engagement with the respective side panel.

2. A support means for a sawhorse as set forth in claim 1, in a combination in which the panel means which extend under the respective end of the rail are respectively provided as extensions of the side panels.

3. A support means for a sawhorse as set forth in claim 1, in a combination in which the panel means which extend under the respective end of the rail are respectively provided as extensions of the side panels which extend integrally therefrom.

4. A support means for a sawhorse as set forth in claim 1, in a combination in which each of the pivot means hold the respective leg to the respective side panel in a manner such that in the latched position of the leg in which it is in extended position for support of the spine rail the leg is lying along the respective side panel, the slope of the side panel thus providing the outward slope of the leg for desired stability of the sawhorse.

5. A support means for a sawhorse as set forth in claim 1, in a combination in which the latch means has components comprising an abutment pin carried by one of the respective leg and side panel, and a opening means provided in the other of the respective leg and side panel, the side panel being provided with two of the latch components for providing the said optional-position leg-latchability effect.

6. A support means for a sawhorse as set forth in claim 5 in a combination in which the latch component which is an opening means and which co-operates to provide leg-retracted latching is of elongated nature, for the bracket body member at both ends of the spine rail, thus providing an allowance of latching position which makes it a matter of indifference as to which leg along a respective side of the spine rail is first moved into leg-retracted latched position.

7. A support means for a sawhorse as set forth in claim 5, in a combination in which respectively the abutment pin is carried by the leg and the opening means is provided in the side panel.

8. A support means for a sawhorse as set forth in claim 6, in a combination in which respectively the abutment pin is carried by the leg and the opening means is provided in the side panel.

9. A support means for a sawhorse as set forth in claim 1 in a combination in which each intermediate panel is provided with a handle means, thus providing for it both the function of a sawhorse handle at each end of the spine rail, thus making sawhorse easy to grasp regardless of which end thereof is being grasped, and a brace which supports the side panels.

10. A support means for a sawhorse having a horizontal spine rail which is supported at each end by a pair of outwardly-spread legs which are connected to the respective end of the spine rail by a support bracket, the support means comprising:

a three-paneled bracket body member, having an intermediate panel and side panels, and and with the side panels extending from the intermediate panel, generally parallel to the axis of the spine rail, but sloping outwardly and downwardly, there being means for connecting the bracket body member to the spine rail, and there are pivot means provided for pivotally interconnecting a sawhorse leg to each of the side panels, and each leg and side panel are provided with co-operative latch means by which the sawhorse legs are latchingly held in optionally an extended position generally parallel to the respective side panel, for support of the spine rail by the sawhorse legs, and in a retracted position also generally parallel to the respective side panel but generally juxtaposed along the spine rail, and each leg is pivotally movable about the axis of the respective pivot means between and into each position of latched engagement with the respective side panel.

11. A support means for a sawhorse as set forth in claim 10, in a combination in which the means for connecting the bracket body member to the spine rail are extensions of the side panels.

12. A support means for a sawhorse as set forth in claim 10, in a combination in which the means for connecting the bracket body member to the spine rail are extensions of the side panels which extend integrally therefrom.

13. A support means for a sawhorse as set forth in claim 10, in a combination in which each of the pivot means hold the respective leg to the respective side panel in a manner such that in a latched position of the leg in which it is in extended position for support of the spine rail the leg is lying along the respective side panel, the slope of the side panel thus providing the outward slope of the leg for desired stability of the sawhorse.

14. A support means for a sawhorse as set forth in claim 10, in a combination in which the latch means has components comprising an abutment pin carried by one of the respective leg and side panel, and a opening means provided in the other of the respective leg and side panel, the side panel being provided with two of the latch components for providing the said optional-position leg-latchability effect.

15. A support means for a sawhorse as set forth in claim 14, in a combination in which the latch component which is an opening means and which co-operates to provide leg-retracted latching is of elongated nature, for the bracket body member at both ends of the spine rail, thus providing an allowance of latching position which makes it a matter of indifference as to which leg along a respective side of the spine rail is fist moved into leg-retracted latched position.

16. A support means for a sawhorse as set forth in claim 14, in a combination in which respectively the abutment pin is carried by the leg and the opening means is provided in the side panel.

17. A support means for a sawhorse as set forth in claim 15, in a combination in which respectively the abutment pin is carried by the leg and the opening means is provided in the side panel.

18. A support means for a sawhorse having a horizontal spine rail which is supported at each end by a pair of outwardly-spread legs each of which are connected to the respective end of the spine rail by a support bracket means, the support means comprising:

a bracket body member, the bracket body member having a side panel extending generally parallel to the axis of the spine rail, and sloping outwardly and downwardly, and the bracket body member also has a panel means which extends under the respective end of the spine rail, on the respective side of the spine rail, for supportive connection thereto, and supporting the side panel in the said relation to the spine rail, and there are pivot means provided for pivotally interconnecting a sawhorse leg to the respective side panel, and the respective leg and side panel are provided with co-operative latch means by which the sawhorse leg is latchingly held in optionally an extended position generally parallel to the respective side panel, for support the spine rail by the sawhorse legs, and in a retracted position also generally parallel to the respective side panel but generally juxtaposed along the spine rail, and the respective leg is pivotally movable about the axis of the respective pivot means between and into each position of latched engagement with the respective side panel.

19. A support means for a sawhorse as set forth in claim 18, in a combination in which the panel means which extends under the respective end of the spine rail is provided as extension of the respective side panel.

20. A support means for a sawhorse as set forth in claim 18, in a combination in which the pivot means hold the respective leg to the respective side panel in a manner such that in the latched position of the leg in which it is in extended position for support of the spine rail the leg is lying along the respective side panel, the slope of the side panel thus providing the outward slope of the leg for desired stability of the sawhorse.

21. A support means for a sawhorse as set forth in claim 18, in a combination in which the latch means has components comprising an abutment pin carried by one of the respective leg and side panel, and a opening means provided in the other of the respective leg and side panel, the side panel being provided with two of the latch components for providing the said optional-position leg-latchability effect.

22. A support means for a sawhorse as set forth in claim 21, in a combination in which the latch component which is an opening means and which co-operates to provide leg-retracted latching is of elongated nature, for the bracket body member at both ends of the spine rail, thus providing an allowance of latching position which makes it a matter of indifference as to which leg along a respective side of the spine rail is first moved into leg-retracted latched position.

23. A support means for a sawhorse as set forth in claim 21, in a combination in which respectively the abutment pin is carried by the leg and the opening means is provided in the side panel.

24. A support means for a sawhorse as set forth in claim 22, in a combination in which respectively the abutment pin is carried by the leg and the opening means is provided in the side panel.

* * * * *

UNITED STATES PATENT AND TRADEMARK OFFICE
CERTIFICATE OF CORRECTION

PATENT NO. : 4,605,099

DATED : August 12, 1986

INVENTOR(S) : Mr. Wesley W. Crum and Mr. Gary L. Fraley

It is certified that error appears in the above-identified patent and that said Letters Patent is hereby corrected as shown below:

Col. 3, 1. 4; The word "legs" should be "leg".

Col. 5, 1. 33; The word "optionally" should be "optionality".

Col. 6, 1. 56; The phrase "We claim" should be "CLAIMS".

Col. 6, 1. 61; The semi-colon should be a colon.

Col. 7, 1. 5; The period should be a comma.

Col. 8, 1. 65; The word "fist" should be "first".

Col. 9, 1. 28; After "support" there should be inserted the word "of".

Signed and Sealed this

Eleventh Day of November, 1986

Attest:

DONALD J. QUIGG

Attesting Officer      Commissioner of Patents and Trademarks